United States Patent Office 3,361,682
Patented Jan. 2, 1968

3,361,682
ALUMINA-BASED CATALYST AND METHOD OF PREPARING SAME
Carl D. Keith, Summit, Paula M. Kenah, East Orange, and George Soustruznik, Caldwell, N.J., assignors to Engelhard Industries, Inc., a corporation of Delaware
No Drawing. Filed June 11, 1965, Ser. No. 463,393
15 Claims. (Cl. 252—464)

ABSTRACT OF THE DISCLOSURE

An alumina-based hydrocarbon conversion catalyst is prepared by extruding a mixture of water and boehmite or amorphous hydrous alumina composed of a major amount of particles of less than about 20 microns in size and essentially free of particles greater than about 30 microns in size. Impregnation with a hydrogenation-promoting metal is preferably conducted after calcining the extrudate. The catalysts are particularly useful in hydrogenation-denitrogenation processes.

---

This invention pertains to novel contact material of improved properties and a process for its manufacture and use. The contact material is of particular value as a catalyst in hydrocarbon hydrogenation procedures and has been found superior to known catalysts for this purpose especially in that its use can provide greater denitrogenation of feedstocks with which it is contacted.

The contact material of this invention is of improved hydrogenation activity and is readily manufactured, being easily extruded during production. The catalyst of this invention is made from an alumina of a much finer particle size than has been employed heretofore.

In this invention, a predominantly boehmite or amorphous hydrous alumina is provided in an ultra-small particle size, extruded to form pellets, impregnated with one or more hydrogenation promoting metal components, dried and usually calcined. It has been found that the resulting catalyst is superior in the properties mentioned to catalysts made from the same type of alumina which has a coarser particle size.

As ordinarily manufactured, the substrate alumina can be obtained by precipitation of alumina from an aqueous solution of an aluminum salt. The precipitate often is spray dried and in many situations the spray-dried particles in themselves are powdery materials. Spray-dried commercially obtainable aluminas often have a particle size less than 200 mesh (74 microns) but few, if any, particles are below 20 microns in size. The predominantly boehmite or amorphous hydrous alumina substrate particles employed in this invention have a major portion with a particle size less than about 20 microns and essentially no particles greater than about 30 microns. Preferably, the alumina particles used in this invention have about 60% or more of their bulk in the size range of about 2–10 microns and may contain some particles smaller than 2 microns.

It has been found that particles of such ultra-small size cannot be made by comminuting apparatus such as granulators, hammer mills, homoloid mills, Chilean mills, etc. Rather, their preparation can be by the use of fluid energy mills which cause comminution of particles by impingement against each other while traveling at high velocities. Such mills, sometimes called "air impact mills" are shown, for example, in U.S. Patents 2,672,296 and 2,704,635, and conventionally produced spray-dried predominantly boehmite or amorphous hydrous alumina particles may conveniently be fed to such devices for disintegration to the particle size used in this invention. An advantage of using impact mills is that they afford particles of relatively uniform particle size, e.g. in producing particles of the size range needed for the present invention there would be little, if any, particles larger than the maximum of the range.

As mentioned, the alumina particles are essentially boehmite, amorphous hydrous alumina or their mixture. A minor portion of the particles may be composed of other materials, e.g. alumina trihydrates or refractory inorganic oxides such as magnesia, silica and zirconia. Preferably, the particles are about 40–95% boehmite with the essential remainder being amorphous hydrous alumina.

The catalyst of this invention is ordinarily used as a fixed bed of macro-sized particles, say of about 1/32 to 3/8 inch, preferably 1/16 to 1/8 inch, in diameter and about 1/8 to 1/2 inch or more in length. Thus the disintegrated alumina is formed to macro-size by more-or-less conventional extrusion procedures. Boehmite and amorphous aluminas are, in general, difficult to extrude, especially after the addition of the promoting metals and/or after the final calcination. Therefore the addition of the promoting metals and the final activation or calcination of the catalyst preferably take place after the forming operation, although addition of the promoting metals may take place before extrusion, especially up to about 50% of the promoting metals. Also it is preferred to calcine, e.g. at temperatures of about 850 to 1300° F., the extruded particles before subsequent addition of promoting metals. Conveniently, nitric acid may be added to the distintegrated alumina particles as an extrusion aid. The nitric acid may react with the alumina hydrate and serve as a binder for the particles but an additional binding material which can be burned out of the formed catalyst in a later stage of manufacture may be added to the particles along with nitric acid. Molasses or other predominantly carbohydrate or fatty organic materials may be employed. Often the weight ratio of alumina to binder will be about 10 to 100 parts alumina to one part binder and when nitric acid is used, about one part of concentrated aqueous nitric acid may be employed for each fifty to five hundred parts of alumina. Water is present in the extrusion mixture in amounts sufficient to give the desired paste or extrusion consistency. About 45 to 55% by weight of the total mixture of free water is often present.

After extrusion the extrudate is broken into the desired size pieces and dried, for example, in a forced-air drier at a temperature of about 150 to 400° F., to remove most of the free water. Any organic material present may be burned out during subsequent calcination. The calcined macro-size catalyst particles of this invention are usually characterized by having a major portion, e.g. at least about 65% or even 75% or more, of their total macropore i.e., at least about 800 A. size, volume in pores of about 800 to 3000 A. size. Thus, the pores are relatively uniform and this type of pore distribution is conducive to more uniform reactant and product flow thereby enhancing the catalytic action.

A number of methods are known for adding promoting metals to a finely divided or a formed macro-sized carrier, for example, by hydrothermal digestion in the presence of a relatively water-insoluble metal compound. Impregnation with an aqueous solution of a salt of the promoting metal followed by decomposition of the salt and conversion of the metal to the oxide, sulfide or other suitable form is a convenient procedure. The promoting metals may be added one by one, for example, by a first impregnation with an aqueous solution of the salt of one promoting metal, followed by evaporation of the water, impregnation with an aqueous solution of the salt of another promoting metal and a second drying, etc., or one or more impregnations with an aqueous solution containing a plurality of promoting metals may be employed. Often, calcination to decompose the first salt may be employed before the second impregnation.

The promoting metals used in the catalyst of this invention are generally Group V, VI and VIII transition metals, especially those of the iron group, precious metals, tungsten, molybdenum and vanadium. A combination of an iron group metal or metals with one or more metals from Group Vb and VIb of the periodic table is particularly desirable, such as a combination of molybdenum with nickel or cobalt. The total amount of promoting metal components on the alumina can vary considerably in the finished catalyst while being sufficient to afford a substantial catalytic effect. In general, this amount is a minor portion of the catalyst and may be as low as about 0.05 percent. Usually the total amount of promoting metal is in the range of about 0.1 to 40 weight percent of the finished catalyst. The individual metallic component will frequently be about 1 to 10 or 15% of the iron group metal and about 5 to 25 or 30% of the other metal as oxides. Catalysts containing about 10 to 20% molybdenum and 3–10% nickel, measured as $MoO_3$ and $NiO$, are preferred.

After impregnation, free water in the catalyst may be removed by evaporation. Conveniently this evaporation may occur even during impregnation by adding a solution of the impregnating salt to the catalyst incrementally while under a slight vacuum. After impregnation, the catalyst is dried. Before use, the catalyst is usually calcined to activate the base and promoting metals and remove water. The calcination is generally conducted at temperatures of about 500 to 1500° F., or more for a suitable period to give an active catalyst, for instance, a period of about 2 to 36 hours, and preferably in a manner minimizing contact time of the catalyst with water vapor at the temperatures encountered. While the calcination will generally be conducted in air, it is also feasible to carry out the same in other oxidizing atmospheres, a reducing atmosphere such as, for example, hydrogen or methane, or an inert atmosphere, such as nitrogen. The calcination provides an activated or gamma-family type alumina. Prior to use the catalyst may be sulfided by contact with $H_2S$ at elevated temperature, e.g. about 400 to 800° F. The sulfiding can also be accomplished during treatment of sulfur-containing mineral oil.

The novel catalyst of this invention is designed primarily, as mentioned, for use in processes wherein mineral hydrocarbons are treated with hydrogen. Generally, these hydrocarbons are the distillable portions of petroleum; that is, these non-residual hydrocarbon streams normally processed in petroleum refineries, and including naphthas, kerosenes, straight run and cracked distillates, distillates derived from shale oil or gilsonite deposits, light and heavy cycle oils, and gas oils. In short, the hydrocarbon is normally liquid and boils primarily in the range of about 180° to 1050° F. The hydrocarbon oil often will contain nitrogen compounds, ranging from several parts per million, e.g. at least about 20, up to about 1–3%.

The catalyst is of particular value in those hydrogenation processes designed primarily for removal of impurities from the hydrocarbon oil (hydrofining) and for increasing the hydrogen-to-carbon ratio of the oil (saturation). Often both of these effects are obtained under the same general reaction condition which may fall within the following ranges: temperature, about 550° to 900° F.; pressure, about 200 to 3,000 p.s.i.g.; weight hourly space velocity about 1 to 8. About 500 to 5000 standard cubic feet of molecular hydrogen can be sent to the hydrogenation zone per barrel of hydrocarbon feed.

The invention will be better understood by reference to the accompanying examples which are to be considered illustrative only and not limiting.

EXAMPLE I

Catalyst samples 3A, 3B and 3C were made using more or less conventional starting materials, namely, 300 lbs. of microspherical alumina powder made by spray-drying a synthetic alumina gel precipitate (alumina powder 176), 12 pounds of molasses, and 1005 ccs. of concentrated nitric acid per batch along with deionized water.

The alumina powder 176 showed 49% amorphous alumina and 51% boehmite by X-ray diffraction analysis was composed of 60.75% solids, that is, matter not volatilized at 1100° C., and had a surface area of about 283 square meters per gram. The powder had the following particle size distribution.

| Microns: | Percent |
|---|---|
| <10 | 0 |
| 10–20 | 0 |
| 20–30 | 2 |
| 30–40 | 5 |
| 40–50 | 31 |
| 50–60 | 28 |
| 60–70 | 16 |
| 70–80 | 11 |
| 80–90 | 5 |
| 90–100 | 2 |

In the preparation of sample 3A, 300 pounds of the alumina powder were placed in a Simpson mixer and the molasses and nitric acid were added after dilution with enough deionized water to make 22.5 gallons. After 10 minutes mixing the paste had 51% moisture. Extrusion was performed in a Welding Engineers dual worm 2 inch extruder having a 1/16 inch die thru which the extrudate passed at a rate of 72 pounds per hour. The formed material was placed in a forced air oven to dry at 110° C.

Portion 3B was made by adding the solution of molasses and nitric acid to 300 lbs. alumina powder 176 in a Simpson mixer as described above, but with enough deionized water to make 25 gallons, and mixed for 50 minutes. The resulting paste, containing 53% moisture, was extruded in the same machine as sample 3A but at a much slower rate. The extrudate was put into the forced air oven to dry at 110° C.

Batch 3C was prepared from ingredients identical to the other batches, enough deionized water was used to prepare 22.9 gallons, and the mix contained 53% moisture after 30 minutes mixing. Extrusion was performed on a Welding Engineers 3½ inch extruder, the entire batch of about 375 pounds being processed in about 2½ hours. This batch, too, was dried at 110° C. in the forced air oven. The three batches of extrudate after drying at 110° C. were composited and further dried to <1% free water on a drying table with preheated air.

The dried extrudate was calcined in a tunnel furnace at about 1100° F. to provide pellets containing about 97% solids. 412 pounds of this mixture (400 pounds on an ignited weight basis) were used to make a hydrogenation catalyst by the following procedure:

80 liters (160 pounds) technical aqua ammonia (28% $NH_3$) and 51 liters (112 pounds) of deionized water were put into a stainless steel tank and 84 pounds of ammonium molybdate (84.5% or 71 pounds $MoOM_3$) along with 11 pounds of ammonium molybdate (82% or 8 pounds $MoO_3$) were added and stirred until dissolved. 100 pounds of Ni $(NO_3)_2 \cdot 6H_2O$ (20 pounds nickel) were added and the mixture stirred to provide 158.28 liters of a clear solution.

The pellets were placed in a rotary vacuum blender and a 26 inch vacuum was applied to evacuate air from the pores of the pellets. The solution was added in less than about 5 minutes while maintaining the vacuum. Then the vacuum was broken and the blender was rotated for an hour to achieve thorough mixing. The mixture was dried on a drying table with preheated air and calcined in a tunnel furnace at about 1050° F. The finished catalyst contained 3.77 percent nickel and 15.51 percent $MoO_3$. Its crushing strength was 3.6 pounds, bulk density 0.64 g./ml., surface area 252 m.²/g., total pore volume 0.68 cc./g. with a pore volume distribution as follows:

| Angstroms: | cc./g. |
| --- | --- |
| <100 | 0.42 |
| 100–800 | 0.11 |
| 800–3,000 | 0.040 |
| 3,000–5,000 | 0.025 |
| 5,000–10,000 | 0.035 |
| 10,000–100,000 | 0.05 |

Samples of this catalyst were used in hydrogenation procedures on light cycle oil, heavy cycle oil and heavy gas oil, as reported below.

EXAMPLE II

To prepare catalyst sample 4, a batch of alumina powder 176 was ground in an air impact mill to give powder 344 which had a surface area of 313 square meters per gram and had 65.16% solids not volatile at 1100° C. The powder had the following particle size distribution:

| Microns: | Percent |
| --- | --- |
| <2 | 0 |
| 2–3 | 7 |
| 3–4 | 11 |
| 4–5 | 12 |
| 5–6 | 11 |
| 6–7 | 10 |
| 7–8 | 9 |
| 8–9 | 8 |
| 9–10 | 7 |
| 10–11 | 3 |
| 11–12 | 2 |
| 12–13 | 5 |
| 13–14 | 5 |
| 14–15 | 3 |
| 15–16 | 2 |
| 16–17 | 1 |
| 17–18 | 1 |
| 18–19 | 1 |
| 19–20 | 1 |
| 20–21 | 1 |

Thus, the particles in this powder were 75% less than 10 microns and 24% 10–20 microns with only 1% greater than 20 microns.

500 pounds of this powder were placed in a Simpson mixer and 41 gallons of a solution containing 10 pounds of molasses and 1675 ml. concentrated nitric acid were added. The slurry was mixed 14 minutes to give a paste containing 49% moisture and 4 gallons of water were added with mixing over a period of about 20 minutes to give a moisture content of 50.8%.

The paste was extruded in a Welding Engineers 3½ inch extruder having a straight long land (⅟₁₆) die and no taper. The extrusion of 617 pounds of pellets took 1.75 hours and subsequent drying and calcination at about 1100° F., gave a product of 97% solids. This extrusion of 617 pounds in 1.75 hours stands in clear contrast to the extrusion of only 375 pounds in 2½ hours in sample 3C. 107 pounds (54 liters) reagent grade concentrated aqueous ammonia and 51 pounds (23 liters) of deionized water were placed in a stainless steel tank and 68 pounds of the 84.5% $MoO_3$ ammonium molybdate were dissolved therein. 70 pounds of the 20% nickel $Ni(NO_3)_2 \cdot 6H_2O$ were then dissolved and 6 more liters water added to make 101.5 liters of a clear solution. 290 pounds of sample 4 pellets (280 pounds alumina) were put into a rotating vacuum blender and the solution was added in six minutes under a vacuum varying from 28–25 inches. After ten more minutes the vacuum was broken and rotation was continued for 45 minutes to thoroughly mix. Then the catalyst was dried on a drying table with preheated air and calcined in a tunnel furnace at about 1050° F.

The finished catalyst contained 3.66 nickel, 15.9% $MoO_3$, had a crush strength of 5.7 pounds per ⅛ inch length, an apparent density of 0.71 grams/ml., a surface area of 246 square meters/gram, a total pore volume of 0.63 ml./gram.

The pore volume distribution of the catalyst was as follows:

| Angstroms: | cc./g. |
| --- | --- |
| <100 | 0.44 |
| 100–800 | 0.03 |
| 800–3,000 | 0.14 |
| 3,000–5,000 | 0.005 |
| 5,000–10,000 | 0.005 |
| 10,000–100,000 | 0.01 |

EXAMPLE III

To prepare catalyst Sample 8, a batch of alumina powder 176 was ground in an air-impact mill to give powder 468, which had the following particle-size distribution.

| Microns: | Percent |
| --- | --- |
| <2 | 2 |
| 2–3 | 13 |
| 3–4 | 15 |
| 4–5 | 17 |
| 5–6 | 13 |
| 6–7 | 10 |
| 7–8 | 8 |
| 8–9 | 5 |
| 9–10 | 4 |
| 10–11 | 3 |
| 11–12 | 3 |
| 12–13 | 3 |
| 13–14 | 2 |
| 14–15 | 3 |

Thus, the particles in this powder were 87% less than 10 microns and 13% greater than 10 microns, but less than 20 microns.

200 pounds of this material were placed in a Simpson mixer and 17.5 gallons of an aqueous solution containing 4 pounds of molasses were added while mixing. Mixing was continued for 20 minutes to give a paste containing 50% moisture. The paste was extruded through a ⅟₁₆" die, using a Welding Engineers 2" dual worm extruder. The extrusion rate was equivalent to that achieved for Sample 4 (Example II), taking into account the difference in size between the two extruders. The formed material was dried in a forced-air oven at 110° C. Three more 200-pound batches of the alumina powder were mixed, extruded and dried, using identical materials and conditions.

Dried extrudate portions from the four batches were mixed and dried further to <1% free moisture on a drying table with preheated air. Subsequent calcination in a tunnel furnace at about 1100° F. gave a product containing about 97% solids. 412 pounds of this mixture (400 pounds on an ignited weight basis) were used to make 500 pounds of catalyst by the following procedure: 80 liters (160 pounds) technical aqua ammonia (28% $NH_3$) and 30 liters (66 pounds) of deionized water were put into a stainless steel tank and 95 pounds of ammonium molybdate (84.5% or 80 pounds $MoO_3$) were added and stirred until dissolved. 100 pounds of $Ni(NO_3)_2 \cdot 6H_2O$ (20 pounds nickel) were added and the mixture stirred to provide 135.6 liters of clear solution.

The alumina pellets were placed in a rotary vacuum blender and a 25-inch vacuum was applied to evacuate air from the pores of the pellets. The solution was added in three portions over a period of nineteen minutes in the following manner: Each portion, consisting of one-third of the total solution, was added in a three-minute period with a five-minute interval between additions, during which mixing was continued by rotation of the blender. After final addition was completed, the vacuum was broken and the blender was rotated for 15 minutes to achieve thorough mixing.

The catalyst was then dried on a drying table with preheated air, and calcined in a tunnel furnace at about 1050° F.

The finished catalyst contained 3.73% nickel and 15.79% $MoO_3$. Its crushing strength was 12.9 pounds, bulk density 0.73 g./ml., surface area 252 m.$^2$/g., total pore volume 0.54 cc./g., with a pore volume distribution as follows:

| Angstroms: | cc./g. |
|---|---|
| <100 | 0.42 |
| 100–800 | 0.03 |
| 800–3,000 | 0.07 |
| 3,000–5,000 | 0.005 |
| 5,000–10,000 | 0.005 |
| 10,000–100,000 | 0.01 |

Samples of this catalyst were used in hydrogenation procedures on heavy cycle oil as reported below. The catalyst was also tested with light cycle oil and heavy gas oil; however, since the feeds were different than those used for the testing of catalysts 3 and 4, the results could not be directly compared and the data are not included.

Each of catalyst samples 3, 4 and 8 was used in catalyst activity tests, the conditions and results of which are given in Table II below. In each run reported the catalyst was presulfided by contact with $H_2S$ for more than one hour at a maximum temperature approximately that of the hydrocarbon treating run. The feedstocks to the tests were a light cycle oil (LCO), a heavy cycle oil (HCO), and a heavy gas oil (HGO). The properties of these are given in Table I.

TABLE I

|  | LCO | HCO | HGO |
|---|---|---|---|
| API gravity | 25.5 | 23.6 | 22.5 |
| Density $n_D^{20}$ | 1.5147 | 1.5250 | 1.5175 |
| Specific dispersion | 194.8 | 218.5 | |
| Percent C | 87.89 | 88.38 | 85.81 |
| Percent H | 11.31 | 11.50 | 12.36 |
| Percent S | 0.658 | 0.650 | 1.30 |
| P.p.m. N, total | 351 | 710 | 1500 |
| P.p.m. N, basic | 57 | 43 | 442 |
| Conradson carbon | 0.002 | 0.004 | 0.85 |
| Aniline point, °C | 44.4 | 71.4 | 94.4 |
| Bromine No | 12.5 | 6.7 | 5.1 |
| Kv./122° F., ca | 2.774 | 7.022 | 98.00 |
| Mol. Wt | 208 | 277 | 462 |
| ASTM Vacuum Distillation: | | | |
| IBP | 409 | 399 | 760 |
| 5% | 482 | 592 | 815 |
| 20% | 515 | 651 | 840 |
| 40% | 545 | 682 | 872 |
| 60% | 576 | 703 | 925 |
| 80% | 607 | 732 | 978 |
| 95% | 640 | 773 | 1042 |

TABLE II

| | Test No. | | | | | | | | |
|---|---|---|---|---|---|---|---|---|---|
| | 243 | 244 | 245 | 246 | 283 | 284 | 285 | 286 | 405 |
| Catalyst Sample | 3 | 3 | 3 | 3 | 4 | 4 | 4 | 4 | 8 |
| Feedstock | LCO | LCO | HCO | HGO | LCO | LCO | HCO | HGO | HCO |
| Conditions: | | | | | | | | | |
| Temperature, °F | 683 | 670 | 726 | 675 | 685 | 678 | 719 | 680 | 725 |
| WHSV | 2 | 4 | 1 | 1 | 2 | 4 | 1 | 1 | 1 |
| Pressure, p.s.i.g | 1,000 | 1,000 | 1,500 | 1,500 | 1,000 | 1,000 | 1,500 | 1,500 | 1,500 |
| $H_2$ rate, s.c.f./b | 2,500 | 2,500 | 2,500 | 5,000 | 2,500 | 2,500 | 2,500 | 5,000 | 5,000 |
| Relative Severity | 0.5575 | 0.2294 | 1.7739 | 1.0091 | 0.5788 | 0.2605 | 1.7147 | 1.0287 | |
| Liquid Product Analysis: | | | | | | | | | |
| Gravity, API | 29.5 | 29.0 | 30.0 | 25.0 | 29.7 | 29.1 | 28.9 | 25.8 | 30.2 |
| Density $n_D^{20}$ | 1.4916 | 1.4941 | 1.4876 | 1.5030 | 1.4903 | 1.4927 | 1.4878 | 1.5020 | 1.4872 |
| Specific Dispersion | 143.3 | 150.3 | 133.5 | | 143.9 | 147.4 | 135.3 | | |
| P.p.m. N, total | 24 | 69 | 15 | 890 | 15 | 51 | 9.7 | 820 | 11 |
| Percent S | 0.016 | 0.037 | 0.006 | 0.172 | 0.010 | 0.032 | 0.006 | 0.159 | 0.005 |
| Percent H | 12.25 | 12.13 | 12.89 | 12.97 | 12.28 | 12.17 | 12.89 | 12.97 | |
| Percent C | 87.72 | 87.88 | 87.09 | 86.73 | 87.75 | 87.79 | 87.12 | 86.85 | |
| P.p.m. N, basic | 0 | 7 | 0 | 257 | 0 | 4 | 0 | 228 | 0 |
| Mol. Wt | 211 | 210 | 279 | 431 | 210 | 280 | 273 | 423 | |
| | | | | 0.16 | | | | 1.47490 | |
| Conradson Carbon | | | | | | | | | |
| Bromine No | 2.3 | 3.1 | 4.2 | 1.9 | 2.9 | 2.9 | 3.6 | 1.7 | 3.0 |
| Kv./122° F | 2.688 | 2.709 | 5.828 | 69.50 | 2.679 | 2.694 | 5.838 | 60.62 | 6.010 |
| Aniline Point, °C | 48.3 | 46.9 | 76.0 | 101.2 | 48.8 | 47.0 | 75.8 | 101.2 | 77.0 |
| ASTM Distillation: | | | | | | | | | |
| IBP °F | | | | 475 | | | | 471 | |
| 10% | 481 | 475 | 550 | 809 | 480 | 485 | 560 | 811 | 557 |
| 30% | 519 | 512 | 629 | 855 | 521 | 519 | 630 | 862 | 635 |
| 50% | 551 | 545 | 670 | 891 | 552 | 550 | 670 | 899 | 674 |
| 70% | 590 | 579 | 699 | 942 | 590 | 588 | 700 | 951 | 706 |
| 90% | 632 | 612 | 742 | 1015 | 630 | 629 | 752 | 1,022 | 750 |
| Catalyst Activities, Weight Basis: | | | | | | | | | |
| Hydrogenation by < RI | 0.478 | 0.577 | 1.066 | 0.833 | 0.644 | 0.760 | 1.086 | 0.991 | 1.115 |
| Hydrogenation by < Percent H | 0.494 | 0.545 | 1.066 | 1.020 | 0.588 | 0.654 | 1.103 | 1.054 | |
| Denitrogenation | 0.541 | 0.565 | 0.911 | | 0.700 | 0.652 | 1.173 | | 1.078 |
| Catalyst Activities, Volume Basis: | | | | | | | | | |
| Hydrogenation by < RI | 0.444 | 0.536 | 0.990 | 0.774 | 0.644 | 0.760 | 1.086 | 0.991 | |
| Hydrogenation by < Percent H | 0.459 | 0.506 | 0.990 | 0.947 | 0.588 | 0.654 | 1.103 | 1.054 | |
| Denitrogenation | 0.502 | 0.525 | 0.846 | | 0.700 | 0.652 | 1.173 | | |

It is readily seen from the data of Table II that sample 4 is significantly superior to sample 3 in denitrogenation activity and hydrogenation activity. Also, the improved extrudibility of catalysts made according to this invention has been pointed out above. The crush strength of catalyst 8 was superior to that of catalyst 3, and while the catalysts have not been tested under identical conditions, the results of Table II indicate that the hydrotreating properties of catalyst 8 are superior to those of catalyst 3.

We claim:

1. A macro-size catalyst suitable for use in the hydro treating of hydrocarbon oils consisting essentially of a catalytic amount of a hydrogenation-promoting metal on an alumina substrate, said alumina substrate having been made by extrusion of a mixture of water and particles of alumina having a major amount of particles of a size less than about 20 microns and essentially free of particles greater than about 30 microns, said particles being selected from the group consisting of boehmite, amorphous hydrous alumina and their mixtures.

2. The catalyst of claim 1 in which at least about 60% of the alumina particles are in a size range of about 2-10 microns.

3. The catalyst of claim 2 having at least about 75% of its macropore volume in pores of about 800 to 3000 A.

4. The catalyst of claim 3 in which the alumina particles are about 40 to 95% boehmite.

5. The catalyst of claim 4 in which the macro-size is about 1/16 to 1/8 inch in diameter and about 1/8 to 1/2 inch in length.

6. The catalyst of claim 5 in which the promoting metal is a combination of an iron group metal with a metal selected from Groups Vb and VIb of the periodic table.

7. The catalyst of claim 6 containing about 1-15% iron group metal oxide and about 5-30% other selected metal oxide.

8. The catalyst of claim 6 containing about 10-20% molybdenum and 3-10% nickel, measured as $MoO_3$ and NiO.

10. A method for making a hydrogenation catalyst which consists essentially of extruding a mixture of water and alumina particles selected from the group consisting of boehmite, amorphus hydrous alumina and their mixtures and having a major portion of its particles of a size less than about 20 microns and essentially free of particles greater than about 30 microns, to obtain macro-size catalyst base particles, adding hydrogenation promoting metal to the alumina, drying the metal-containing base and calcining the dried material at a temperature of about 500–1500° F. to provide an activated catalyst.

11. The method of claim 10 in which the alumina particles are provided by reducing the size of larger alumina particles in a fluid energy mill.

12. The method of claim 11 in which hydrogenation promoting metal is added to the alumina after said extrusion.

13. The method of claim 12 in which at least about 60% of the alumina particles are in a size range of about 2-10 microns, and the catalyst has at least about 75% of its macropore volume in pores of about 800 to 3000 A.

14. The method of claim 13 in which the promoting metal is a combination of an iron group metal with a metal selected from Groups Vb and VIb of the periodic table.

15. The method of claim 2 in which the extruded particles are calcined at about 850 to 1300° F. before subsequent addition of promoting metal.

References Cited
UNITED STATES PATENTS

| | | | |
|---|---|---|---|
| 3,193,348 | 7/1965 | Mooi | 208—136 |
| 3,267,025 | 8/1966 | Gring et al. | 208—136 |

SAMUEL P. JONES, *Primary Examiner.*

DELBERT E. GANTZ, *Examiner.*

UNITED STATES PATENT OFFICE
CERTIFICATE OF CORRECTION

Patent No. 3,361,682                        January 2, 1968

Carl D. Keith et al.

It is hereby certified that error appears in the above numbered patent requiring correction and that the said Letters Patent should read as corrected below.

Column 8, TABLE I, fourth column, line 15 thereof "815" should read -- 810 --; same TABLE I, fourth column, line 16 thereof, "840" should read -- 845 --. Columns 7 and 8, TABLE II, first column, lines 31, 32, 35 and 36 thereof, "<", each occurrence, should read -- Δ --. Column 9, between lines 26 and 27, insert 9. The catalyst of claim 6 in which the extruded particles are calcined at about 850 to 1300° F. before subsequent addition of promoting metal.

Column 10, line 20, for the claim reference numeral "2" should read -- 12 --.

Signed and sealed this 14th day of October 1969.

(SEAL)
Attest:

EDWARD M. FLETCHER, JR.
Attesting Officer

WILLIAM E. SCHUYLER, JR.
Commissioner of Patents